(12) United States Patent
Matousek et al.

(10) Patent No.: US 9,984,719 B2
(45) Date of Patent: May 29, 2018

(54) LASER MODE HOPPING DETECTION FOR HEAT-ASSISTED MAGNETIC RECORDING DEVICE

(71) Applicant: Seagate Technology LLC, Cupertino, CA (US)

(72) Inventors: Robert Matousek, Berthoud, CO (US); Todd Lammers, Lafayette, CO (US); Jon David Trantham, Chanhassen, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 14/957,220

(22) Filed: Dec. 2, 2015

(65) Prior Publication Data

US 2017/0162222 A1   Jun. 8, 2017

(51) Int. Cl.

| G11B 11/00 | (2006.01) |
|---|---|
| G11B 11/105 | (2006.01) |
| G11B 7/126 | (2012.01) |
| G11B 5/40 | (2006.01) |
| G11B 5/455 | (2006.01) |
| G11B 19/04 | (2006.01) |
| G11B 7/13 | (2012.01) |
| G11B 5/31 | (2006.01) |
| G11B 7/1267 | (2012.01) |
| G11B 7/1263 | (2012.01) |
| G11B 5/00 | (2006.01) |

(52) U.S. Cl.
CPC .......... *G11B 11/10534* (2013.01); *G11B 5/40* (2013.01); *G11B 5/455* (2013.01); *G11B 7/126* (2013.01); *G11B 19/046* (2013.01); *G11B 5/314* (2013.01); *G11B 7/1263* (2013.01); *G11B 7/1267* (2013.01); *G11B 7/13* (2013.01); *G11B 11/10595* (2013.01); *G11B 2005/0021* (2013.01)

(58) Field of Classification Search
None
See application file for complete search history.

(56) References Cited

U.S. PATENT DOCUMENTS

| 7,710,686 | B2 | 5/2010 | Kim et al. | |
|---|---|---|---|---|
| 8,393,074 | B1 * | 3/2013 | Takayama | G11B 5/314 250/201.3 |
| 8,570,842 | B1 * | 10/2013 | Richter | G11B 5/314 369/13.33 |
| 8,842,506 | B1 | 9/2014 | Matsumoto et al. | |
| 8,854,930 | B1 | 10/2014 | Clinton et al. | |
| 8,908,481 | B1 * | 12/2014 | Miyamoto | G11B 5/314 369/13.33 |

(Continued)

OTHER PUBLICATIONS

T.A. Heumier, et al.: Article entitled: "Mode Hopping in Semiconductor Lasers", Dept of Physics, Montana State University, Oct. 1992, 13 pgs.

*Primary Examiner* — Tan X Dinh
(74) *Attorney, Agent, or Firm* — Taylor English Duma LLP

(57) ABSTRACT

Methods and apparatuses for detecting mode hopping in a laser diode or other optical energy source in heat-assisted magnetic recording. An output power of the laser diode or other optical energy source is measured and the output power is differentiated over time to determine a rate of change. If it is determined that the rate of change exceeds a threshold value, a fault signal is asserted indicating a potential mode hopping event.

18 Claims, 6 Drawing Sheets

(56) References Cited

U.S. PATENT DOCUMENTS

| | | | |
|---|---|---|---|
| 9,047,926 B2 | 6/2015 | Contreras et al. | |
| 9,418,691 B2* | 8/2016 | Peng | G11B 5/314 369/13.26 |
| 9,583,135 B1* | 2/2017 | Ma | G11B 20/10305 369/13.26 |
| 9,595,288 B1* | 3/2017 | Chu | G11B 7/1267 369/13.26 |
| 9,792,949 B1* | 10/2017 | Ma | G11B 20/1816 369/13.26 |
| 9,818,447 B1* | 11/2017 | Zheng | G11B 7/126 369/13.26 |
| 2009/0296257 A1* | 12/2009 | Nakano | G11B 5/09 360/71 |
| 2011/0122737 A1 | 5/2011 | Shimazawa et al. | |
| 2011/0242691 A1* | 10/2011 | Burger | G11B 5/012 360/31 |
| 2012/0280717 A1* | 11/2012 | Fu | G01R 31/1218 327/14 |
| 2014/0097761 A1* | 4/2014 | Chen | H05B 33/0893 315/192 |
| 2014/0232585 A1* | 8/2014 | Richardson | G01S 13/885 342/22 |
| 2015/0109892 A1* | 4/2015 | Contreras | G11B 5/4866 369/13.26 |
| 2015/0235665 A1* | 8/2015 | Chu | G11B 5/6088 369/13.26 |
| 2015/0247722 A1* | 9/2015 | Takayama | G01B 11/272 369/13.26 |
| 2015/0279430 A1* | 10/2015 | Trantham | G11B 5/314 369/13.26 |
| 2015/0340053 A1* | 11/2015 | Peng | G11B 5/314 369/13.33 |
| 2016/0087402 A1* | 3/2016 | Tatah | H01S 5/06804 369/13.26 |
| 2016/0104514 A1* | 4/2016 | Burnett | G11B 5/6088 369/13.26 |
| 2016/0189741 A1* | 6/2016 | Tatah | H01S 5/06804 369/13.26 |
| 2016/0232928 A1* | 8/2016 | Honda | G11B 5/4866 369/13.26 |
| 2017/0085364 A1* | 3/2017 | Patapoutian | H04L 27/148 369/13.33 |

* cited by examiner

LASER MODE HOPPING DETECTION FOR HEAT-ASSISTED MAGNETIC RECORDING DEVICE

BRIEF SUMMARY

The present disclosure relates to methods and apparatuses for detecting mode hopping in a laser diode or other optical energy source in heat-assisted magnetic recording. According to some embodiments, a method comprises measuring an output power of the laser diode or other energy source and differentiating the output power over time to determine a rate of change. Next, it is determined whether the rate of change exceeds a threshold value, and upon determining that the rate of change exceeds the threshold level, a fault signal is asserted indicating a potential mode hopping event.

According to further embodiments, a storage device is configured to measure an output power of an energy source in an optical heating element of a read/write head configured for heat-assisted magnetic recording ("HAMR") during a write operation of data to a recording media of the storage device. A rate of change of the output power over time is determined, and if the rate of change of the output power exceeds a threshold value, a fault signal is asserted to a controller of the storage device indicating a potential write fault.

According to further embodiments, a preamplifier for a hard disk drive ("HDD") implementing heat-assisted magnetic recording ("HAMR") includes a differentiator circuit configured to receive a signal from a photodetector and produce a differentiated signal, the photodetector being optically coupled to a laser diode in a read/write head in the HDD. The preamplifier also includes a threshold detector configured to determine if the differentiated signal exceeds a threshold voltage level, and upon determining that the differentiated signal exceeds the threshold voltage level, the preamplifier asserts a fault signal to a controller of the HDD.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to methods, apparatuses, and systems for detecting mode hopping in a laser diode or other optical energy source in a storage device, such as a hard disk drive ("HDD") device utilizing heat-assisted magnetic recording ("HAMR"). HAMR-enabled HDD devices use a thermal energy source located on the read/write head to temporarily heat an area of the magnetic recording surface to which data is currently being written. The heat changes the magnetic coercivity of the magnetic grains or islands on the surface, reducing or removing the super-paramagnetic effect that limits the areal density of recording media in traditional devices. Thus the use of HAMR technology may allow for increased data capacities in HDD devices.

According to embodiments, the thermal energy source may comprise an optical energy source, such as a laser diode or other laser device. The read/write head may further include optical components, such as a waveguide, that direct and concentrate the light energy from the laser diode to a target area on the recording surface during writing. The concentrated light energy spot-heats the target area in order to raise the temperature of the area above the Curie temperature while a magnetic recording head applies a magnetic field to polarize the area. Since the heated area of the recording surface is very small, the amount of energy applied by the laser diode is minimal. The energy output of the laser diode must be controlled, however, to ensure that the operable temperature is reached so that the data is successfully written to the recording surface.

The optical components of the read/write head may further include a sensor for measuring the light output of the laser diode that is utilized as a feedback mechanism for regulating the output power of the laser. The sensor may comprise any component that senses light output, such as a photodiode, a phototransistor, a bolometer, or the like. The sensor typically converts the light output from the laser diode into a voltage or current that can be measured by a control circuit for the laser.

When the laser is in operation, the temperature of the laser diode may increase, which can cause rapid, discrete changes in the oscillation wavelength of the laser from one longitudinal mode to another longitudinal mode. This phenomenon is known as "mode hopping" and causes sudden shifts in the magnitude of the output power from the laser diode. Such rapid changes in output energy of the laser diode may introduce recording noise, potentially causing undetected write errors, or "stale data miscompares." This reduces the data integrity and reliability of the HDD device.

Figure 1:
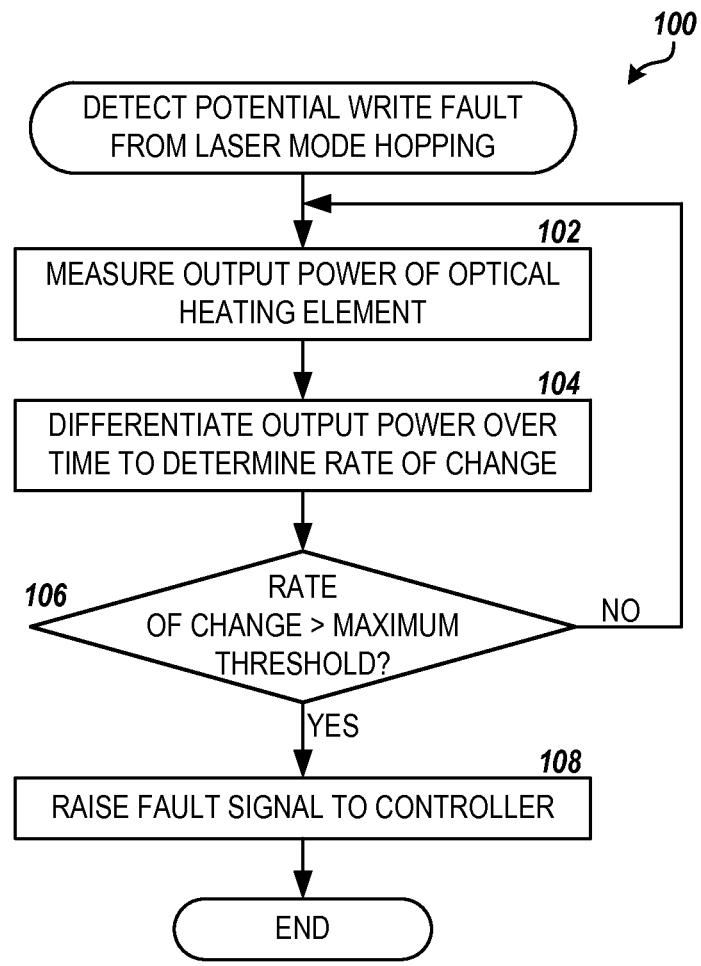
FIG. 1 is a flow diagram showing one method for detecting mode hopping in a laser diode or other optical energy source in heat-assisted magnetic recording, according to embodiments described herein.

Utilizing the embodiments described herein, an HDD device or other storage device that utilizes a laser diode or other optical energy source can be configured to detect laser mode hopping during write operations and raise a fault signal in order to prevent undetected write errors. According to some embodiments, the preamp of the HDD device may be configured to detect a sudden change in laser light delivery from the laser indicating a state change or mode hop in the laser diode. FIG. 1 illustrates one method of performing mode hopping detection in a laser diode or other optical energy source, according to some embodiments. For example, the routine 100 may be performed during a write operation in an HDD device implementing HAMR technology. According to some embodiments, the routine 100 may be performed by logic and/or circuitry in a preamp of the HDD device. In other embodiments, the routine 100 may be performed by a fault circuit or logic module in a controller of the HDD device.

The routine 100 includes step 102, where the output power of the optical energy source is measured. For example, output power of a laser diode may be measured by a sensor, such as a photodiode, photoresistor, phototransistor, bolometer, or the like, located in the read/write head of the device with the laser diode. A waveguide implemented in the read/write head with the laser diode may distribute a portion of the light energy to the sensor to facilitate measurement. The sensor may provide a voltage signal representing the output power of the laser diode over time, or P(t).

From step 102, the routine 100 proceeds to step 104, where the signal P(t) from the power sensor is differentiated over time to determine a rate of change in the output power of the optical heating element. The signal from the power sensor may be differentiated using a high-pass filter, and AC-coupled differentiator, or the like, according to some embodiments. The output signal of the differentiator represents the rate of change in the output power of the laser diode at any given time, or dP/dt. Because the change in output power of the laser diode that occurs in a mode hop can be very low (e.g., 1% or less), the rate of change signal dP/dt from the differentiator may further be amplified before analysis, as will be described in more detail below.

The routine 100 proceeds from step 104 to step 106, where it is determined if the rate of change of the output power from the laser diode or other optical energy source exceeds a threshold value. For example, a threshold detector may receive the signal dP/dt from the differentiator and compare is to a configurable threshold value determined to indicate a likely mode hop in the laser diode or laser device. The threshold value and may be preset in the logic and/or circuitry based on the characteristics of the laser diode or other optical energy source implemented, or it may be determined by testing of the specific storage device or model of storage device, according to some embodiments.

If the rate of change of the output power from the laser diode exceeds the maximum threshold, the routine 100 proceeds from step 106 to step 108, where a fault signal is raised to the controller of the HDD device. The fault signal may represent the potential of a write error due to mode hopping that occurred during the write. The controller may then retry the write operation and/or report the failure to the host device to avoid loss of the data. From step 108, the routine 100 ends.

Figure 2:
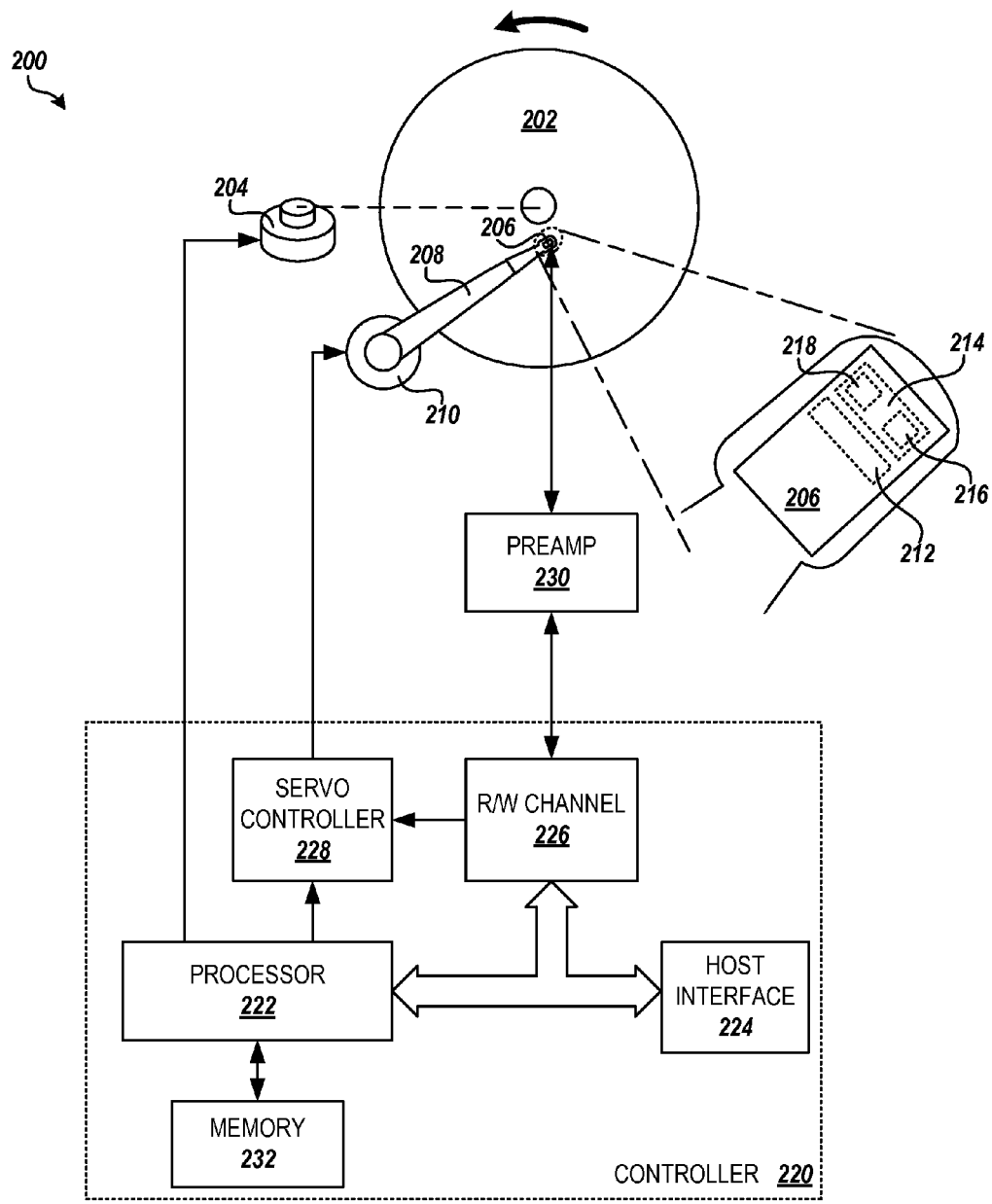
FIG. 2 is a block diagram showing an illustrative environment for mode hopping detection, according to embodiments described herein.

FIG. 2 and the following description are intended to provide a general description of a suitable environment in which the embodiments described herein may be implemented. In particular, FIG. 2 shows an illustrative storage device 200, such as an HDD device, along with hardware, software and components for detecting mode hopping in a laser diode or other optical energy source in a read/write head of the device, according to the embodiments provided herein. The storage device 200 may include rotational storage media comprising at least one platter or disk 202 rotatable by a spindle motor 204, with each disk having at least one magnetic recording surface or coating.

The storage device 200 further includes at least one read/write head 206 located adjacent to each recording surface of the disks 202. The read/write heads 206 may read information from the disks 202 by sensing a magnetic field formed on portions of the recording surfaces, and may write information to the disks by magnetizing a portion of the surfaces. The read/write heads 206 may be located at the distal end of an arm 208, the arm being further connected to an actuator 210, such as a voice coil motor ("VCM"), that repositions the read/write heads 206.

Each read/write head 206 may comprise one or more magnetic writer elements 212. According to embodiments, the read/write head 206 further includes an optical heating element 214 that is utilized in conjunction with the magnetic writer element 212 to write data to the magnetic recording surface of the disk 202 utilizing HAMR technology. The optical heating element 214 includes an optical energy source 216, such as a laser diode or other laser device. The optical heating element 214 may also include an optical waveguide, a near field transducer ("NFT"), and other components that direct, concentrate, and transform light energy from the optical energy source to a spot on the recording surface to raise the temperature of the media and enable magnetic polarization of the media by the writer element 212 for the storage of data.

According to further embodiments, the read/write head 206 also includes at least one photodetector 218 for measuring the light energy output of the laser diode or other optical energy source 216. The photodetector 218 may comprise any component that senses light output, such as a photodiode, a photoresistor, a phototransistor, a bolometer, or the like. The waveguide may distribute a portion of the light energy from the optical energy source 216 to the photodetector 218 to facilitate measurement. The photodetector 218 may convert the light output from the optical energy source 216 into a voltage or current that can be used in a feedback mechanism for regulating the output power of the laser diode. It will be appreciated by one of ordinary skill in the art that each read/write head 206 may comprise additional components, including one or more magneto-resistive ("MR") or tunneling MR reader elements, micro-actuators, head heaters, sliders, and the like.

The storage device 200 may further comprise a controller 220 that controls the operations of the storage device. The controller 220 may include a processor 222 to monitor and control the operations of the storage device 200. The controller may further include a host interface 224 allowing the storage device 200 to communicate with a host device or other components, such as a server computer, personal computer ("PC"), laptop, tablet, game console, set-top box or any other electronics device that can be communicatively coupled to the storage device 200 to store and retrieve data from the storage device. The controller 220 may process write commands from the host device by formatting the associated data and transfer the formatted data via a read/write channel 226 through the read/write head 206 and to a target location on the recording surface of the disk 202. The controller 220 may further process read commands from the host device by determining the target location on the recording surface containing the desired data, moving the read/write head(s) 206 over the determined location, reading the data from the recording surface via the read/write channel 226, correcting any errors and formatting the data for transfer to the host device.

The read/write channel 226 may convert data between the digital signals received by the host interface 224 and/or processed by the processor 222 and the analog signals conducted through the read/write heads 206 for reading and writing data to the recording surface of the disks 202. The read/write channel 226 may further provide servo data read from the disk 202 to a servo controller 228 that drives the actuator 210 to position the read/write head 206. The read/write heads 206 may be positioned to read or write data to the target locations on the recording surface of the disks 202 by moving the read/write heads 206 radially across the disks using the actuator 210 while the spindle motor 204 rotates the disk to bring the target location under the read/write head.

The analog signals from to and from the read/write heads 206 through the read/write channel 226 may be further processed through a preamplifier 230. The preamplifier 230 conditions and distributes the analog signals from the read/write channel 226 to the various read/write heads 206 and allows control of other elements on the read/write heads, such as flying-height heaters, optical heating elements 214, and the like. The preamplifier 230 may be located in close proximity to the read/write heads 206, such as attached to the actuator arm 208. According to embodiments, the preamplifier 230 is further configured to detect anomalies in the components of the read/write heads 206 during write operations and raise write faults to the processor 222, as will be described in more detail below.

The controller 220 may further include a computer-readable storage medium or "memory" 228 for storing processor-executable instructions, data structures, and other information. The memory 232 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). The memory 232 may further comprise a portion of the storage media of the storage device 200, such as the maintenance cylinder ("M/C") of the disk 202. For example, the memory 232 may store a firmware that comprises commands and data necessary for performing the operations of the storage device 200. According to some embodiments, the memory 232 may store a maximum threshold value for the rate of change of the output power from the optical energy source 216 that indicates a likely mode hop in the laser diode or laser device, as described herein.

In addition to the memory 232, the environment may include other computer-readable media storing program modules, data structures and other data described herein. It will be appreciated by those skilled in the art that computer-readable media can be any available media that may be accessed by the controller 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

It will be appreciated that the structure of the storage device 200 may be different that that illustrated in FIG. 2 and described herein. For example, the processor 222, read/write channel(s) 226, preamplifier 230, memory 232, and other components and circuitry of the storage device 200 may be integrated within a common integrated circuit package, such as a system-on-a-chip ("SoC"), or they may be distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 3:
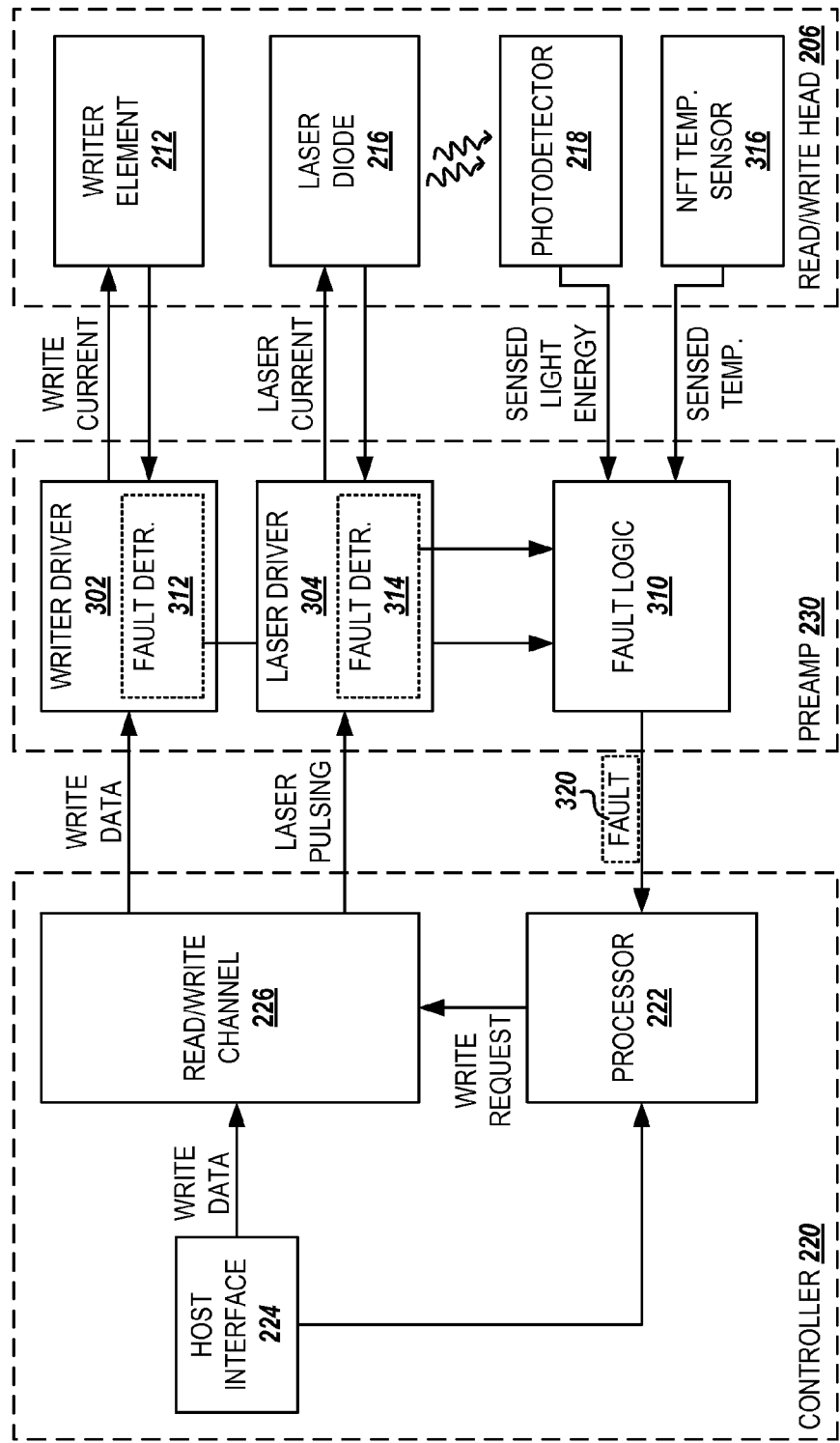
FIG. 3 is a block diagram showing additional details of the illustrative environment for mode hopping detection, according to embodiments described herein.

FIG. 3 shows details of a fault detection system in the illustrative storage device 200, according to some embodiments. To prevent undetected write errors, an HDD or other storage device 200 based on the embodiments described herein may implement multiple feedback loops for the detection of various types of failures, particularly for detecting failures related to HAMR. In some embodiments, some or all of this fault detection circuitry may reside in the preamplifier 230. As described above, the preamplifier 230 may contain a writer driver 302 that receives the write signal from the read/write channel 226, conditions the signal, and drives the writing current to the writer element 212 on the target read/write head 206 for writing data to the media. In addition, the preamplifier 230 may contain a laser driver 304 that receives a laser pulsing signal from the read/write channel 226 and drives the current to the laser diode or other optical energy source 216 in the optical heating element 214 of the HAMR-enable read/write head 206.

According to embodiments, the preamplifier 230 further contains fault logic 310 to detect failures that may occur during writing operations. The fault logic 310 may receive feedback signals from fault detectors 312, 314 in the writer driver 302 and laser driver 304, the photodetector 218 in the optical heating element 214, an NFT temperature sensor 316 in the optical heating element 214, and other sensors or detectors in the read/write head 206 or other components during a write operation and utilize the feedback signals to detect failure that may have resulted in a write error. For example, some or all of the following failure modes may be detected by processing the feedback signals from the fault detectors 312, 314 and sensors 218, 316:

Writer failure (open or short-circuit, current or voltage out-of-range, etc.)
Laser diode failure (current or voltage out-of-range, etc.)
Laser diode interconnection failure (open, shorted, shorted to ground, etc.)
Pulsing control signal failure (write without laser)
Preamp output driver circuitry failure
Preamp interconnection failures (inputs and outputs)
Optical waveguide failure
Laser diode mode hopping If a failure is detected during a write operation, the fault logic 310 asserts a fault signal 320 back to the controller 220 of the storage device 200 indicating the potential for write error exists. For example, the fault logic 310 may raise a fault signal 320 to the processor 222, and the processor may perform error recovery to avoid loss of the data. Error recovery may comprise retrying the write operation with read verification, reporting the failure to the host device, and the like. In addition, the fault logic 310 may indicate the nature of the failure by storing failure codes and other information in one or more registers in the preamplifier 230. The controller 220 may then interrogate the register values when a fault signal 320 is raised in order to determine the appropriate action(s) to take (retry write, notify host, disable head, shutdown device, etc.)

Figure 4:
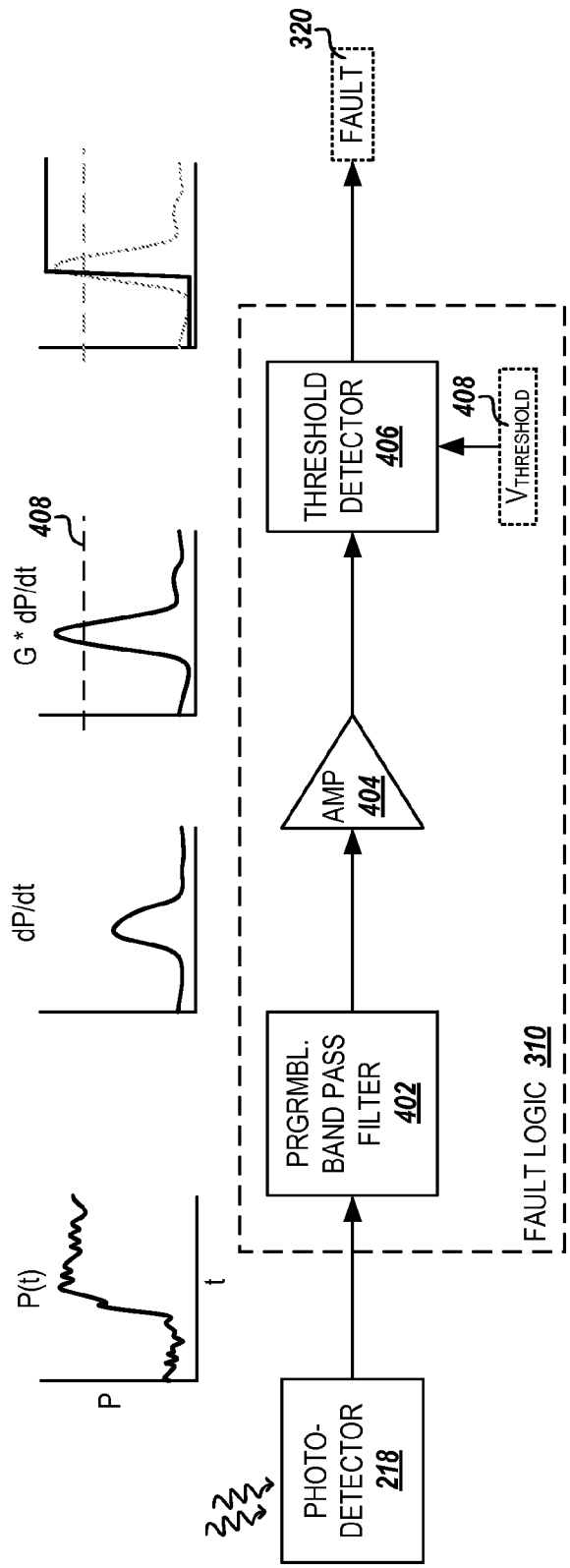
FIG. 4 is a block diagram showing details of illustrative fault logic for the detection of mode hopping in a laser diode, according to embodiments described herein.

FIG. 4 illustrates one implementation of fault logic 310 comprising components to detect mode hopping in the laser diode or other optical energy source 216 in the optical heating element 214, according to some embodiments. The fault logic 310 receives a signal from the photodetector 218 in the optical heating element 214 indicating the output power of the laser (optical energy source 216) over time, referred to as P(t) in the figure. In some embodiments, the fault logic may pass the power signal P(t) through a programmable band-pass filter 402. The programmable band-pass filter 402 may be configured to implement a low-pass filter ("LPF") to remove any high-frequency noise present in the power signal and a high-pass filter ("HPF") to differentiate the signal, producing a differentiated signal representing the rate of change in the output power of the laser diode at any given time, referred to as dP/dt in FIG. 4. In other embodiments, the power signal P(t) may be differentiated using any differentiator circuit known in the art, including an AC-coupled differentiator, a passive differentiator, an active differentiator, and the like. According to further embodiments, a LPF may be implemented after the differentiator circuit, since typical differentiators are inherently noisy.

Because the sudden shift in output power of the laser diode that occurs in a mode hop can be very low (e.g., 1% or less), the fault logic 310 may next send the differentiated signal dP/dt to an amplifier where it is amplified before further analysis. Next, the amplified differentiated signal G*dP/dt is sent to a threshold detector 406. The threshold detector 406 is configured to assert a digital fault signal 320 to the controller when the differentiated signal exceeds a configurable threshold value. According to embodiments, the threshold value corresponds to a rate of change in the output power of the laser diode that indicates a likely mode hop. In some embodiments, the threshold value is configurable in the storage device 200. For example, the threshold value may be determined during a configuration testing or "burn-in" phase of the storage device 200 and stored in the memory 232 of the controller. In other embodiments, the threshold value may be preset in the preamplifier 230 for the model or class of storage devices in which the preamplifier is implemented, based on the type and characteristics of the laser diode or other optical energy source 216 utilized in the optical heating element 214.

According to some embodiments, the threshold detector 406 may comprise a comparator and a digital logic circuit. The threshold value may represent a threshold voltage level 408 than is supplied to the threshold detector by the fault logic 310. The threshold voltage level 408 may be received directly from the controller 220, or the processor 222 in the storage device 200 may set a register value in the preamplifier 230 from which the threshold voltage level is generated by the fault logic 310. The threshold voltage level 408 may be compared to the amplified differentiated signal G*dP/dt by the comparator, and when the threshold level is exceeded, the threshold detector 406 may raise the digital fault signal 320 to the controller 220. As shown in FIG. 4, the fault signal 320 is raised at the point in time corresponding to the crossing point of the amplified differentiated signal G*dP/dt and the threshold voltage level 408. According to further embodiments, the fault signal 320 may remain asserted until reset by the controller 220 or upon initiation of a subsequent write operation, for example.

Figure 5:
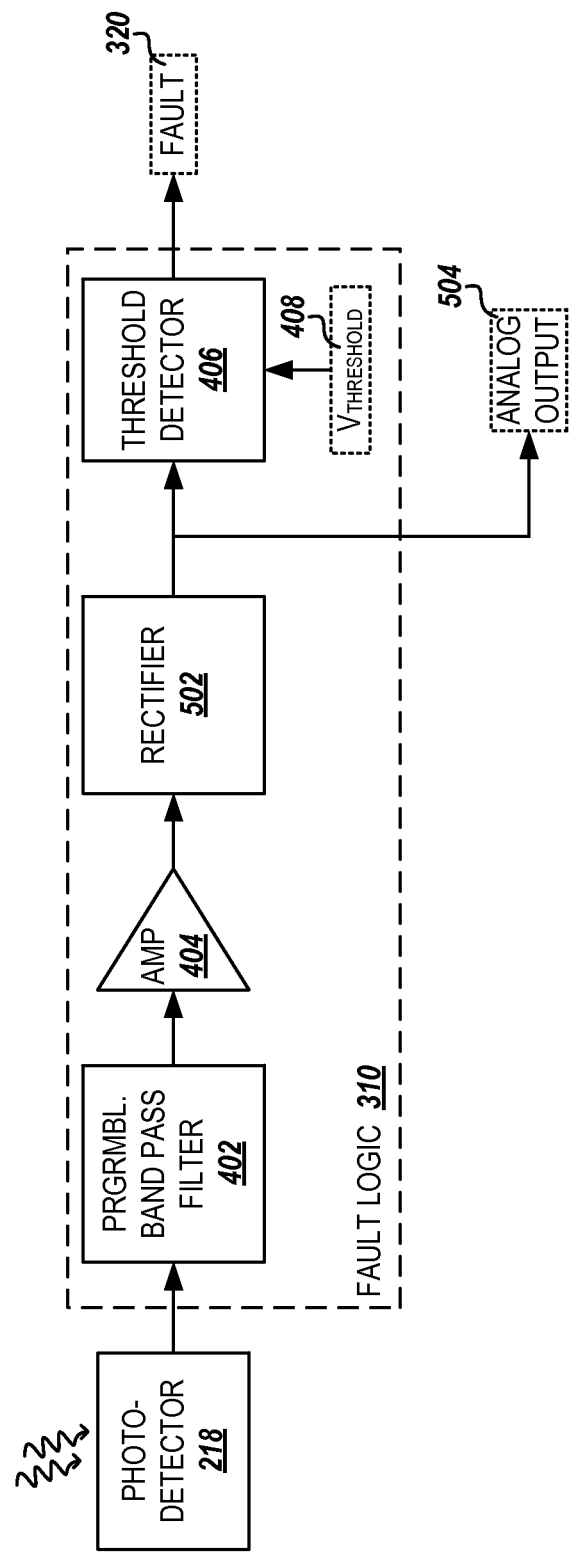
FIG. 5 is a block diagram showing details of fault logic for the detection of mode hopping in a laser diode including rectification of the signal, according to embodiments described herein.

It will be appreciate that the sudden change in laser power indicating a mode hop in the laser diode may be either positive or negative i.e., the differentiated signal dP/dt may indicate a rapid positive change in output power or a rapid negative change in output power. According to some embodiments, the fault logic 310 may be implemented with both positive and negative threshold voltage levels 408 that are utilized by the threshold detector 406 to detect the mode hop. In further embodiments, the fault logic 310 may pass the differentiated signal dP/dt through a rectifier 502 before sending the signal to the threshold detector 406, as shown in FIG. 5. In this way, a single threshold voltage level 408 may be utilized to detect both positive and negative sudden changes in the output power of the laser diode. As further shown in FIG. 5, the fault logic 310 may also provide an analog output 504 of the differentiated signal dP/dt, according to some embodiments. This analog output 504 of the differentiated (and rectified) signal may allow the controller 220 to perform its own fault detection from the signal or perform other signal analysis from the signal independent of the fault logic 310 in the preamplifier 230.

Figure 6:
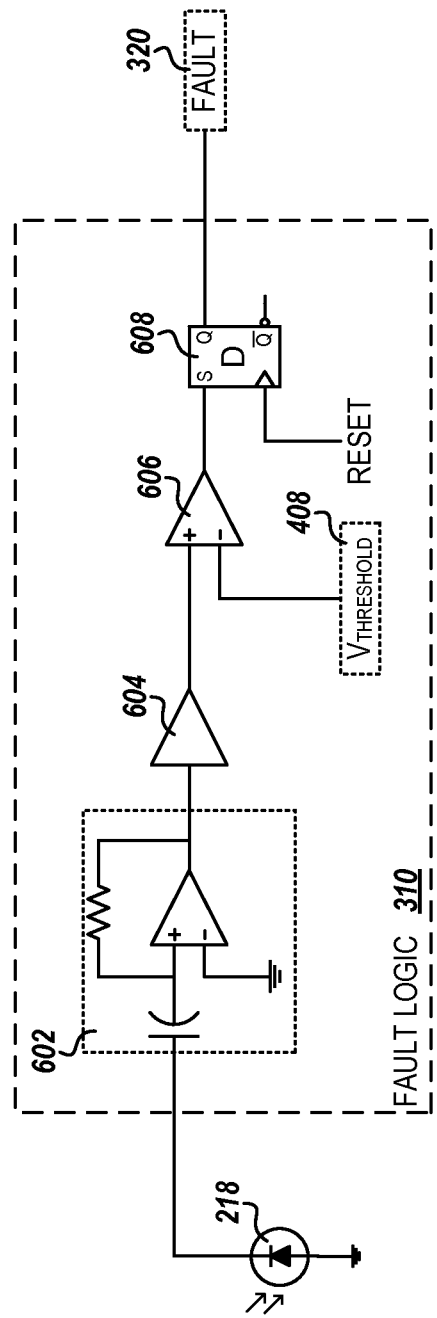
FIG. 6 is a circuit diagram showing one implementation of fault logic for the detection of mode hopping in a laser diode, according to embodiments described herein.

FIG. 6 is a circuit diagram showing another illustrative implementation of the fault logic 310 comprising components to detect mode hopping in the laser diode or other optical energy source 216 in the optical heating element 214, according to further embodiments. The implementation shown in the figure utilizes a photodiode for the photodetector 218 which is connected to an AC coupled differentiator circuit 602. The capacitor and feedback resistor values for the differentiator circuit 602 may be chosen based on the range of frequencies representing the rate of the change in laser output power expected, for example. In some embodiments, a filter circuit, such as a LPF, may be implemented after the differentiator circuit 602 to filter out high-frequency noise in the signal, since typical differentiators are inherently noisy. The output of the differentiator circuit 602 is amplified by a signal amplifier 604 and fed to a comparator 606.

The comparator 606 compares the voltage level from the differentiator circuit 602 to a threshold voltage level 408 and outputs a digital signal indicating which is larger. The output of the comparator 606 may be fed to a digital latch circuit 608. If the voltage from the differentiator circuit exceeds a threshold voltage level 408, then the digital latch circuit 608 is set asserting the fault signal 320 on the appropriate output (FLT) of the preamplifier 230. According to further embodiments, the fault signal 320 may remain asserted until reset by the controller 220 or upon initiation of a subsequent write operation, for example.

In further embodiments, methods and mechanisms of detecting rapid change in the output power of the laser diode or other optical energy source 216 from source signals other than a signal from a photodetector 218 in the optical heating element 214 may be alternatively or additionally implemented in the fault logic 310. For example, the fault logic 310 may utilize a same or similar circuit to that shown in FIGS. 4-6 and described above to differentiate a signal representing the amount of voltage or current supplied to the laser diode by the laser driver 304 and compare the differentiated signal to a threshold value measurement to detect a mode hop since abrupt changes in the voltage or current in the laser diode can similarly signal a mode hopping event. In additional embodiments, multiple sensors of differing types producing time variant signals related to the output power of the laser diode or other optical energy source 216 may be analyzed simultaneously by the fault logic 310 in a fashion described herein to detect mode hopping in the laser.

Based on the foregoing, it will be appreciated that methods and apparatuses for detecting mode hopping in a laser diode or other optical energy source in heat-assisted magnetic recording are presented herein. It will be appreciated that the structure and/or organization of the components of the preamplifier 230 and fault logic 310 may be different from that illustrated in FIGS. 3-6 and described herein. For example, the programmable band-pass filter 402, the amplifier 404, 604, the threshold detector 406, the differentiator circuit 602, the comparator 606, the digital latch circuit 608, and/or other components and circuitry of the fault logic 310 may be implemented in digital logic, analog circuits, software, or any combination thereof, and may be integrated within a common integrated circuit package or the components may be distributed among multiple integrated circuit packages.

Similarly, the illustrated connection pathways are provided for purposes of illustration and not of limitation, and some components and/or interconnections may be omitted for purposes of clarity. It will be further appreciated that the fault logic 310 may not include all of the components shown in the figures, or may include other components that are not explicitly shown in the figures. In addition, while the embodiments presented herein are described in relation to an HDD device implementing HAMR technology, it will be further appreciated that the methods and apparatuses describe herein may be utilized in any storage device containing a laser diode or other laser device, including a solid-state hybrid drive ("SSHD") device, an optical disk drive device, and the like.

The logical steps, functions, or operations described herein as part of a method, process or routine may be implemented (1) as interconnected digital circuits or components and/or (2) as a sequence of processor-implemented acts, software modules, or portions of code running on a controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method for detecting mode hopping in a laser diode of a storage device, the method comprising steps of:
   receiving a time-variant signal from a photodetector optically connected to the laser diode while the laser diode is engaged for writing data to a recording media of the storage device, the time-variant signal indicating a light energy output of the laser diode;
   differentiating the signal over time to produce a differentiated signal representing a rate of change in the light energy output of the laser diode;
   determining whether the differentiated signal exceeds a threshold value indicating a rapid change in an oscillation wavelength of the laser diode; and
   upon determining that the differentiated signal exceeds the threshold value, asserting a fault signal to a controller of the storage device indicating a potential write-fault due to a mode hopping event in the laser diode.

2. The method of claim 1, wherein the photodetector comprises a bolometer.

3. The method of claim 1, wherein differentiating the signal over time is performed by a high-pass filter.

4. The method of claim 1, wherein differentiating the signal over time is performed by an AC-coupled differentiator circuit.

5. The method of claim 1, wherein determining whether the amplified differentiated signal exceeds a threshold value is performed by a comparator.

6. The method of claim 1, wherein the steps are performed by a fault logic circuit in a preamplifier of a hard disk drive ("HDD") device implementing heat-assisted magnetic recording ("HAMR") technology.

7. A storage device configured to:
   measure a voltage output of a photodetector optically connected to a laser diode in an optical heating element of a read/write head configured for heat-assisted magnetic recording ("HAMR") during a write operation of data to a recording media of the storage device, the voltage output representing a light energy output of the laser diode;
   determine a rate of change in the voltage output of the photodetector over time;
   determine whether the rate of change in the voltage output of the photodetector exceeds a threshold value indicating a rapid change in an oscillation wavelength of the laser diode; and
   if the rate of change of the voltage output of the photodetector exceeds the threshold value, assert a fault signal to a controller of the storage device indicating a potential write fault.

8. The storage device of claim 7, wherein determining the rate of change of the voltage output of the photodetector over time is performed by a differentiation circuit.

9. The storage device of claim 8, wherein the differentiation circuit comprises a high-pass filter.

10. The storage device of claim 8, wherein the photodetector comprises a bolometer.

11. The storage device of claim 8, wherein an output of the differentiation circuit is compared to a threshold voltage level corresponding to the threshold value in a comparator to determine if the rate of change of the voltage output of the photodetector exceeds the threshold value.

12. The storage device of claim 8, wherein the controller is configured to, upon assertion of the fault signal, perform error recovery to avoid loss of the data.

13. The storage device of claim 8, wherein the measuring, determining, and asserting are performed by a preamplifier component of the storage device.

14. A preamplifier for a hard disk drive ("HDD") implementing heat-assisted magnetic recording ("HAMR"), the preamplifier comprising:
   a differentiator circuit configured to receive a signal from a photodetector and produce a differentiated signal representing a rate of change in light energy output of a laser diode at any given time, the photodetector optically coupled to the laser diode in an optical heating element of a read/write head in the HDD; and a threshold detector configured to determine if the differentiated signal exceeds a threshold voltage level indicating a rapid change in an oscillation wavelength of the laser diode, and upon determining that the differentiated signal exceeds the threshold voltage level, assert a fault signal to a controller of the HDD.

15. The preamplifier of claim 14, further comprising an amplifier configured to amplify the differentiated signal.

16. The preamplifier of claim 14, further comprising a low pass filter to filter out high-frequency noise in the signal from the photodetector.

17. The preamplifier of claim 14, further comprising a rectifier for rectifying the differentiated signal.

18. The preamplifier of claim 14, wherein differentiator circuit comprises a high-pass filter configured in a programmable band-pass filter.

* * * * *